US011795275B2

(12) United States Patent
Knott et al.

(10) Patent No.: US 11,795,275 B2
(45) Date of Patent: Oct. 24, 2023

(54) REACTIVE SILOXANES

(71) Applicant: Evonik Operations GmbH, Essen (DE)

(72) Inventors: Wilfried Knott, Essen (DE); Horst Dudzik, Essen (DE); Philippe Favresse, Ratingen (DE); Michael Fiedel, Essen (DE); André Brötzmann, Essen (DE)

(73) Assignee: Evonik Operations GmbH, Essen (DE)

( * ) Notice: Subject to any disclaimer, the term of this patent is extended or adjusted under 35 U.S.C. 154(b) by 192 days.

(21) Appl. No.: 17/297,372

(22) PCT Filed: Nov. 19, 2019

(86) PCT No.: PCT/EP2019/081728
§ 371 (c)(1),
(2) Date: May 26, 2021

(87) PCT Pub. No.: WO2020/114762
PCT Pub. Date: Jun. 11, 2020

(65) Prior Publication Data
US 2022/0033587 A1 Feb. 3, 2022

(30) Foreign Application Priority Data
Dec. 4, 2018 (EP) .................................... 18210035

(51) Int. Cl.
C08G 77/18 (2006.01)
C08G 77/38 (2006.01)
C08G 77/14 (2006.01)

(52) U.S. Cl.
CPC ............ *C08G 77/38* (2013.01); *C08G 77/14* (2013.01); *C08G 77/18* (2013.01)

(58) Field of Classification Search
None
See application file for complete search history.

(56) References Cited

U.S. PATENT DOCUMENTS

| 2,910,496 | A  | 10/1959 | Bailey et al. |
| 3,032,532 | A  | 5/1962  | Bruner |
| 3,346,610 | A  | 10/1967 | Omietanski et al. |
| 3,356,758 | A  | 12/1967 | Omietanski et al. |
| 4,066,680 | A  | 1/1978  | Lewis et al. |
| 4,177,201 | A  | 12/1979 | De Montigny et al. |
| 5,371,161 | A  | 12/1994 | Knott |
| 5,430,166 | A  | 7/1995  | Klein et al. |
| 5,430,167 | A  | 7/1995  | Klein et al. |
| 5,455,367 | A  | 10/1995 | Klein et al. |
| 5,475,127 | A  | 12/1995 | Klein et al. |
| 5,565,183 | A  | 10/1996 | Knott |
| 5,856,548 | A  | 1/1999  | Droese et al. |
| 6,255,511 | B1 | 7/2001  | Klein et al. |
| 6,291,622 | B1 | 9/2001  | Droese et al. |
| 6,307,082 | B1 | 10/2001 | Klein et al. |
| 6,489,498 | B2 | 12/2002 | Klein et al. |
| 6,858,663 | B2 | 2/2005  | Knott et al. |
| 7,018,458 | B2 | 3/2006  | Knott et al. |
| 7,125,585 | B2 | 10/2006 | Dudzik et al. |
| 7,157,541 | B2 | 1/2007  | Knott et al. |
| 7,196,153 | B2 | 3/2007  | Burkhart et al. |
| 7,598,334 | B2 | 10/2009 | Ferenz et al. |
| 7,605,284 | B2 | 10/2009 | Brueckner et al. |
| 7,612,158 | B2 | 11/2009 | Burkhart et al. |
| 7,612,159 | B2 | 11/2009 | Burkhart et al. |
| 7,619,035 | B2 | 11/2009 | Henning et al. |
| 7,645,848 | B2 | 1/2010  | Knott et al. |
| 7,754,778 | B2 | 7/2010  | Knott et al. |
| 7,825,205 | B2 | 11/2010 | Knott et al. |
| 7,825,206 | B2 | 11/2010 | Neumann et al. |
| 7,825,209 | B2 | 11/2010 | Knott et al. |
| 7,855,265 | B2 | 12/2010 | Thum et al. |
| 8,138,294 | B2 | 3/2012  | Henning et al. |
| 8,247,525 | B2 | 8/2012  | Schubert et al. |
| 8,268,939 | B2 | 9/2012  | Ebbrecht et al. |
| 8,283,422 | B2 | 10/2012 | Schubert et al. |
| 8,309,664 | B2 | 11/2012 | Knott et al. |
| 8,309,673 | B2 | 11/2012 | Schubert et al. |

(Continued)

FOREIGN PATENT DOCUMENTS

| CA | 1125780 | 6/1982 |
| CA | 3099860 | 11/2019 |

(Continued)

OTHER PUBLICATIONS

Knott et al., U.S. Appl. No. 17/239,011, filed Apr. 23, 2021.
Knott et al., U.S. Appl. No. 17/476,417, filed Sep. 15, 2021.
Schierle et al., U.S. Appl. No. 17/339,276, filed Aug. 11, 2021.
German language International Search Report dated Dec. 4, 2019 in PCT/EP2019/081728 (4 pages).
International Search Report dated Dec. 4, 2019 in PCT/EP2019/081728 (2 pages).
Written Opinion dated Dec. 4, 2019 in PCT/EP2019/081728 (7 pages).
Brook, "Silicon in Organic, Organometallic and Polymer Chemistry", John Wiley & Sons, Inc., New York (2000), p. 264 ff. (5 pages).
Noll, Chemie und Technologie der Silicone [Chemistry and Technology of the Silicones], Verlag Chemie GmbH, Weinheim (1960), p. 2 ff. (20 pages).

(Continued)

*Primary Examiner* — Marc S Zimmer
(74) *Attorney, Agent, or Firm* — Grüneberg and Myers PLLC

(57) ABSTRACT

The invention describes (i) reaction systems for the production of siloxanes bearing acetoxy functions, comprising a) silanes and/or siloxanes bearing alkoxy groups and/or b) silanes and/or siloxanes bearing acetoxy groups, c) silanes and/or siloxanes bearing hydroxy groups, d) optionally simple siloxane cycles and/or DT cycles, e) a reaction medium, comprising acetic anhydride, perfluoroalkanesulfonic acid and preferably acetic acid, (ii) a process for producing linear or branched siloxanes bearing acetoxy functions and also the use of same for producing polyethersiloxanes.

22 Claims, No Drawings

(56) References Cited

U.S. PATENT DOCUMENTS

| | | | |
|---|---|---|---|
| 8,324,325 B2 | 12/2012 | Knott et al. | |
| 8,334,355 B2 | 12/2012 | Henning et al. | |
| 8,349,907 B2 | 1/2013 | Henning et al. | |
| 8,420,748 B2 | 4/2013 | Henning et al. | |
| 8,450,514 B2 | 5/2013 | Schubert et al. | |
| 8,455,603 B2 | 6/2013 | Ferenz et al. | |
| 8,557,944 B2 | 10/2013 | Henning et al. | |
| 8,598,295 B2 | 12/2013 | Henning et al. | |
| 8,609,798 B2 | 12/2013 | Knott et al. | |
| 8,623,984 B2 | 1/2014 | Henning et al. | |
| 8,722,834 B2 | 5/2014 | Knott et al. | |
| 8,722,836 B2 | 5/2014 | Knott et al. | |
| 8,729,207 B2 | 5/2014 | Hartung et al. | |
| 8,772,423 B2 | 7/2014 | De Gans et al. | |
| 8,779,079 B2 | 7/2014 | Henning et al. | |
| 8,802,744 B2 | 8/2014 | Knott et al. | |
| 8,841,400 B2 | 9/2014 | Henning et al. | |
| 8,921,437 B2 | 12/2014 | Knott et al. | |
| 8,946,369 B2 | 2/2015 | Henning et al. | |
| 8,957,009 B2 | 2/2015 | Schubert et al. | |
| 8,969,502 B2 | 3/2015 | Knott et al. | |
| 8,974,627 B2 | 3/2015 | Schubert et al. | |
| 8,993,706 B2 | 3/2015 | Schubert et al. | |
| 9,035,011 B2 | 5/2015 | Ferenz et al. | |
| 9,068,044 B2 | 6/2015 | Schubert et al. | |
| 9,315,614 B2 | 4/2016 | Schubert et al. | |
| 9,334,354 B2 | 5/2016 | Ferenz et al. | |
| 9,353,225 B2 | 5/2016 | Knott et al. | |
| 9,441,145 B2 | 9/2016 | Schubert et al. | |
| 9,481,695 B2 | 11/2016 | Knott et al. | |
| 9,695,202 B2 | 7/2017 | Henning et al. | |
| 9,783,635 B2 | 10/2017 | Schubert et al. | |
| 9,896,541 B2 | 2/2018 | Fiedel et al. | |
| 9,975,909 B2 | 5/2018 | Schubert et al. | |
| 10,087,278 B2 | 10/2018 | Lobert et al. | |
| 10,099,211 B2 | 10/2018 | Knott et al. | |
| 10,106,649 B2 | 10/2018 | Fiedel et al. | |
| 10,399,998 B2 | 9/2019 | Knott et al. | |
| 10,407,592 B2 | 9/2019 | Amajjahe et al. | |
| 10,414,871 B2 | 9/2019 | Knott et al. | |
| 10,414,872 B2 | 9/2019 | Knott et al. | |
| 10,519,280 B2 | 12/2019 | Knott et al. | |
| 10,526,454 B2 | 1/2020 | Knott et al. | |
| 10,544,267 B2 | 1/2020 | Knott et al. | |
| 10,752,735 B2 | 8/2020 | Knott et al. | |
| 10,766,913 B2 | 9/2020 | Knott et al. | |
| 10,787,464 B2 | 9/2020 | Fiedel et al. | |
| 10,793,662 B2 | 10/2020 | Günther et al. | |
| 10,836,867 B2 | 11/2020 | Knott | |
| 10,954,344 B2 | 3/2021 | Knott et al. | |
| 11,021,575 B2 | 6/2021 | Knott et al. | |
| 11,066,429 B2 | 7/2021 | Knott et al. | |
| 11,286,351 B2 * | 3/2022 | Knott | C08G 77/38 |
| 11,345,783 B2 | 5/2022 | Knott et al. | |
| 2002/0161158 A1 | 10/2002 | Burkhart et al. | |
| 2007/0128143 A1 | 6/2007 | Gruning et al. | |
| 2009/0088488 A1 | 4/2009 | Bruckner et al. | |
| 2009/0137752 A1 | 5/2009 | Knott et al. | |
| 2010/0022435 A1 | 1/2010 | Henning et al. | |
| 2010/0081781 A1 | 4/2010 | Schubert et al. | |
| 2011/0230619 A1 | 9/2011 | Kuppert et al. | |
| 2011/0301254 A1 | 12/2011 | Knott et al. | |
| 2012/0068110 A1 | 3/2012 | Schubert et al. | |
| 2012/0282210 A1 | 11/2012 | Henning et al. | |
| 2013/0041115 A1 | 2/2013 | Knott et al. | |
| 2013/0213267 A1 | 8/2013 | Fiedel et al. | |
| 2013/0345318 A1 | 12/2013 | Schubert et al. | |
| 2014/0256844 A1 | 9/2014 | Henning et al. | |
| 2014/0309446 A1 | 10/2014 | Amajjahe et al. | |
| 2015/0004112 A1 | 1/2015 | Ritter et al. | |
| 2015/0004113 A1 | 1/2015 | Ritter et al. | |
| 2016/0130402 A1 | 5/2016 | Schubert et al. | |
| 2018/0016392 A1 | 1/2018 | Lobert et al. | |
| 2018/0258228 A1 | 9/2018 | Amajjahe et al. | |
| 2018/0305596 A1 | 10/2018 | Schubert et al. | |
| 2019/0106369 A1 | 4/2019 | Schubert et al. | |
| 2019/0112502 A1 | 4/2019 | Sloot et al. | |
| 2020/0055991 A1 | 2/2020 | Knott et al. | |
| 2020/0339612 A1 | 10/2020 | Knott et al. | |
| 2020/0377524 A1 | 12/2020 | Knott et al. | |
| 2020/0377525 A1 | 12/2020 | Knott et al. | |
| 2020/0377526 A1 | 12/2020 | Knott et al. | |
| 2020/0377640 A1 | 12/2020 | Knott et al. | |
| 2020/0377660 A1 | 12/2020 | Knott et al. | |
| 2020/0377663 A1 | 12/2020 | Favresse et al. | |
| 2020/0377665 A1 | 12/2020 | Knott et al. | |
| 2020/0377666 A1 | 12/2020 | Knott et al. | |
| 2020/0377667 A1 | 12/2020 | Favresse et al. | |
| 2020/0377668 A1 | 12/2020 | Favresse et al. | |
| 2020/0377669 A1 | 12/2020 | Knott et al. | |
| 2020/0377684 A1 | 12/2020 | Hermann et al. | |
| 2020/0377686 A1 | 12/2020 | Favresse et al. | |
| 2020/0385528 A1 | 12/2020 | Knott | |
| 2021/0130551 A1 | 5/2021 | Knott et al. | |
| 2021/0163687 A1 | 6/2021 | Knott et al. | |
| 2021/0171719 A1 | 6/2021 | Knott et al. | |
| 2021/0206972 A1 | 7/2021 | Schulz et al. | |
| 2021/0253780 A1 | 8/2021 | Wessely et al. | |
| 2021/0253799 A1 | 8/2021 | Knott et al. | |
| 2021/0301099 A1 | 9/2021 | Knott et al. | |
| 2021/0371598 A1 | 12/2021 | Knott et al. | |

FOREIGN PATENT DOCUMENTS

| | | |
|---|---|---|
| CA | 3099861 | 11/2019 |
| CN | 111386300 A | 7/2020 |
| DE | 1545110 | 6/1969 |
| DE | 42 39 246 C1 | 12/1993 |
| DE | 103 37 309 A1 | 3/2005 |
| DE | 10 2011 005 607 | 9/2012 |
| DE | 20 2010 017 915.7 | 3/2013 |
| DE | 10 2012 210 556 A1 | 12/2013 |
| DE | 10 2013 208 328 A1 | 11/2014 |
| DE | 10 2014 211 680 A1 | 2/2015 |
| DE | 10 2009 019 002 U1 | 5/2015 |
| DE | 20 2009 019 002 | 5/2015 |
| EP | 0 003 285 A1 | 8/1979 |
| EP | 0 514 737 A1 | 11/1992 |
| EP | 1 350 804 A1 | 10/2003 |
| EP | 3 611 215 A1 | 2/2020 |
| EP | 3611216 | 2/2020 |
| EP | 3611217 | 2/2020 |
| WO | 2013/010747 A1 | 1/2013 |
| WO | 2014/002919 A1 | 1/2014 |
| WO | 2014/104388 A1 | 7/2014 |
| WO | 2017/185737 A1 | 11/2017 |
| WO | 2019/219446 | 11/2019 |
| WO | 2021/058263 A1 | 4/2021 |

OTHER PUBLICATIONS

Pola et al., Collect. Czech. Chem. Commun. 1974, 39(5), 1169-1176 (8 pages).

Simmler, Houben-Weyl, Methods of Organic Chemistry, vol. VI/2, 4th Edition, O-Metal Derivates of Organic Hydroxy Compounds p. 162 ff.

Borisov et al., "Acetoxysiloxane Oligomers I. The Interaction of Acetic Anhydride with Cyclic Dimethylsiloxanes", J. Organomet. Chem., vol. 11, 1968, pp. 27-33.

European Search Report dated Nov. 4, 2020, in EP 20177746.3, 6 pages.

U.S. Appl. No. 17/239,011, filed Apr. 23, 2021, 2021/0371598, Knott et al.

U.S. Office Action dated Apr. 7, 2023, in U.S. Appl. No. 17/239,011, 10 pages.

Jaumann et al., "Hyperbranched Polyalkoxysiloxanes via AB$_3$-Type Monomers", Macromolecular Chemistry and Physics, vol. 204, No. 7, 2003, pp. 1014-1026.

(56) References Cited

OTHER PUBLICATIONS

Zhu et al., "One-Pot Synthesis of Hyperbranched Polyethoxysiloxanes", Macromolecules, vol. 39, No. 5, 2006, pp. 1701-1708.

* cited by examiner

REACTIVE SILOXANES

CROSS REFERENCE TO RELATED APPLICATIONS

This application is a 35 U.S.C. § 371 U.S. national phase entry of International Application No. PCT/EP2019/081728 having an international filing date of Nov. 19, 2019, which claims the benefit of European Application No. 18210035.4 filed Dec. 4, 2018, both of which are incorporated herein by reference in its entirety.

FIELD

The invention relates to a process for producing linear or branched siloxanes bearing terminal acetoxy functions, and to a process for producing linear or branched polyethersiloxanes starting from these acetoxysiloxanes.

BACKGROUND

The as yet unpublished European patent application EP18189073.2 describes a process for producing trifluoromethanesulfonic acid-acidified siloxanes bearing acetoxy groups, in which cyclic siloxanes, in particular comprising $D_4$ (octamethylcyclotetrasiloxane) and/or $D_5$ (decamethylcyclopentasiloxane), and/or mixtures of cyclic branched siloxanes of the D/T type are reacted with acetic anhydride using trifluoromethanesulfonic acid as catalyst and with addition of acetic acid.

Preferred variants specified therein for producing branched siloxanes bearing acetoxy groups comprise using cyclic branched siloxanes of the D/T type (=DT cycles), more precisely
  a) mixtures of cyclic branched siloxanes of the D/T type which consist exclusively of siloxanes having D and T units and whose cumulative proportion of D and T units present in the siloxane matrix and having Si-alkoxy and/or SiOH groups, determinable by $^{29}$Si NMR spectroscopy, is ≤2 mole percent, preferably less than 1 mole percent, and which preferably contain at least 5 percent by weight of siloxane cycles, such as preferably octamethylcyclotetrasiloxane ($D_4$), decamethylcyclopentasiloxane ($D_5$) and/or mixtures of these or else
  b) mixtures of cyclic branched siloxanes having exclusively D and T units whose cumulative proportion of D and T units present in the siloxane matrix and having Si-alkoxy and/or SiOH groups, determinable by $^{29}$Si NMR spectroscopy, is greater than 2 and less than 10 mole percent.

It has now surprisingly been found that even silanes and/or siloxanes having contents of bonded Si-alkoxy and/or SiOH groups, determinable via $^{29}$Si NMR spectroscopy, that are higher than in the embodiment variant of EP18189073.2 identified with b) are suitable for the production of acetoxysiloxanes and in particular also of branched siloxanes bearing terminal acetoxy groups, and this is in no way limited to mixtures of cyclic branched siloxanes.

The teaching of U.S. Pat. No. 3,032,532 already points towards the possibility of producing linear acetoxysiloxanes of the AcO(SiR$_2$O)$_n$Ac type starting from hexaorganodisiloxanes or linear diorganopolysiloxanes that have been terminated with organic radicals (silicone oils) or that have been capped with hydrolyzable radicals such as OAc radicals, OH radicals, halogen atoms or alkoxy radicals, by way of reaction with acetic anhydride, preferably in the presence of boron triacetate and pyridine as catalyst.

However, in Examples 1, 4, 5 and 6, describing therein the reaction with acetic anhydride, extremely long reaction times of up to 88 hours, but at least 24 hours, are cited. Data in said document regarding acetoxy content and viscosity do not, however, permit an assessment of the equilibration result achieved here in each case. Furthermore, the use in said document of pyridine is of detriment to the reactions with regard to possible industrial production.

SUMMARY

Surprisingly, it has been found within the context of the present invention that a reaction system, comprising (in particular essentially consisting of)
  silanes and/or siloxanes bearing alkoxy groups
    and/or
  silanes and/or siloxanes bearing acetoxy groups,
    and/or
  silanes and/or siloxanes bearing hydroxy groups
  optionally in the presence of simple siloxane cycles
    and/or
  optionally in the presence of DT cycles,
  in a reaction medium, comprising (in particular essentially consisting of) acetic anhydride, perfluoroalkanesulfonic acid and preferably acetic acid
  can be converted after short reaction times into linear and/or branched siloxanes bearing terminal acetoxy functions.

DETAILED DESCRIPTION

The invention therefore provides a reaction system for producing siloxanes bearing acetoxy functions, comprising (in particular consisting of)
  a) silanes and/or siloxanes bearing alkoxy groups and/or
  b) silanes and/or siloxanes bearing acetoxy groups and/or
  c) silanes and/or siloxanes containing hydroxy groups,
  d) optionally simple siloxane cycles and/or DT cycles,
  e) a reaction medium, comprising acetic anhydride, perfluoroalkanesulfonic acid (especially trifluoromethanesulfonic acid) and preferably acetic acid.

The inventive reaction system thus comprises at least the reactants a) and/or b) and/or c) and optionally d) and also with e) a reaction medium, wherein acetic anhydride, perfluoroalkanesulfonic acid and optionally acetic acid also actively participate in the reaction process, as will be shown more specifically further below.

In a preferred embodiment, the inventive reaction system comprises, in particular consists of: components a) and e). In another preferred embodiment, the inventive reaction system comprises, in particular consists of: components b) and e). In yet another preferred embodiment, the inventive reaction system comprises, in particular consists of: components c) and e). In a preferred embodiment, the inventive reaction system comprises, in particular consists of: components a), d) and e). In another preferred embodiment, the inventive reaction system comprises, in particular consists of: components b), d) and e). In yet another preferred embodiment, the inventive reaction system comprises, in particular consists of: components c), d) and e). In a preferred embodiment, the inventive reaction system comprises, in particular consists of: components a), b) and e). In yet another preferred embodiment, the inventive reaction system comprises, in particular consists of: components a), c) and e). In another preferred embodiment, the inventive reaction system comprises, in particular consists of: components b), c) and e). In a preferred embodiment, the inventive reaction system comprises, in particular consists of: components a), b), d) and e). In yet another preferred embodiment, the inventive reaction system comprises, in particular consists of: components a), c), d) and e). In another preferred embodiment, the inventive reaction system comprises, in particular consists of: components b), c), d) and e). In a preferred embodiment, the inventive reaction system comprises, in particular consists of: components a), b), c) and e). In another preferred embodiment, the inventive reaction system comprises, in particular consists of: components a), b), c), d) and e). In each of these aforementioned embodiments, component e) comprises in particular acetic anhydride, trifluoromethanesulfonic acid and acetic acid.

DT cycles within the context of the invention are cyclic branched siloxanes of the D/T type which consist exclusively of siloxanes having D and T units. It is preferred that their cumulative proportion of D and T units present in the siloxane matrix and having Si-alkoxy and/or SiOH groups, determinable by $^{29}$Si NMR spectroscopy, is ≤2 mole percent, preferably less than 1 mole percent, or else is greater than 2 and less than 10 mole percent.

Simple siloxane cycles are constructed solely from D units and within the context of this invention are particularly preferably octamethylcyclotetrasiloxane ($D_4$), decamethylcyclopentasiloxane ($D_5$), dodecamethylcyclohexasiloxane ($D_6$) and/or mixtures thereof.

One advantage of the reaction system claimed according to the invention consists in the controlled, reproducible production of linear and/or branched siloxanes bearing terminal acetoxy functions with short reaction times.

It has surprisingly been found that the inventive reaction medium both reactants such as silanes and/or siloxanes bearing alkoxy groups and silanes and/or siloxanes bearing acetoxy groups and/or silanes and/or siloxanes containing hydroxy groups, and which optionally also in the presence of simple siloxane cycles and/or optionally in the presence of DT cycles within the context of an overall reaction comprising both condensing and equilibrating sub-steps, enables such a complete reaction that the resulting siloxanes bearing terminal acetoxy functions at the most have remaining proportions of SiOH and/or SiOR groups that are below the detection limit measurable by $^{29}$Si NMR.

The degree of importance attributed to the reaction medium claimed according to the invention, within the context of a speedy and complete reaction regime, will become clear on examining, for example, the work by M. Jaumann et al. in Macromol. Chem. Phys. 2003, 204, 1014-1026. With the aim of synthesizing hyperbranched polyalkoxysiloxanes via $AB_3$ structured monomers, the authors also describe the reaction of tetraethoxysilane with acetic anhydride while drawing off ethyl acetate. The reaction is conducted at 137° C. over 36 hours and despite the extremely long reaction time affords the acetoxytriethoxysilane sought in only 39% yield.

In a more recent publication (Macromolecules 2006, 19, 1701-1708), very expensive and hydrolytically labile tetrakis(trimethylsiloxy)titanium is used as a catalyst for the same reaction. These works, which are of course concerned only with the condensing discharge of alkyl acetates from SiOR/acetic anhydride reaction systems, thus do not provide any approach to a solution for industrial applications on the production scale.

Without being tied down to theoretical considerations hereinbelow, the experiments carried out according to the invention prove that—besides the condensation reactions proceeding under the conditions of the SiOSi reorganization reactions (equilibration), proceeding in a characteristic manner in acidic equilibrations, and also possibly in the presence of silanes and/or siloxanes containing hydroxy groups, in accordance with $2Si—OH\rightarrow \equiv Si—O—Si\equiv +H_2O$—very special importance is attributed to the following sub-steps that proceed in the reaction medium, comprising acetic anhydride, perfluoroalkanesulfonic acid and preferably acetic acid in accordance with the invention, and that are outlined exemplarily here:

  a)

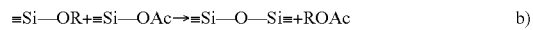  b)

  c)

and, in the event that silanes and/or siloxanes containing hydroxy groups are present, also:

  d)

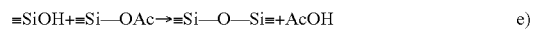  e)

where ≡Si=silanic radical and/or any desired silicone radical where R=alkyl radical, branched alkyl radical, cycloalkyl radical having 1 to 10 carbon atoms, preferably having 1 to 4, particularly preferably having 2 carbon atoms (=ethyl-) ROAc=alkyl acetate Ac=acetyl radical ($CH_3C(O)$) and AcOH=acetic acid and $Ac_2O$=acetic anhydride.

Should water be present, which could also be formed from the condensation reaction, originating from the presence of silanes and/or siloxanes containing hydroxy groups, according to

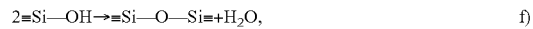  f)

the following reactions are relevant:

  g)

and

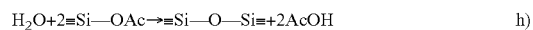  h)

The sub-steps a) to h) outlined above are based on theoretical considerations, serve merely for simplified illustration of the invention and are intended to facilitate understanding of the invention. They in no way whatsoever represent a restriction of the claimed subject-matter.

Cited as a reference in relation to the M, D, T, Q nomenclature used in the context of this document to describe the structural units of organopolysiloxanes is W. Noll, Chemie und Technologie der Silicone [Chemistry and Technology of the Silicones], Verlag Chemie GmbH, Weinheim (1960), page 2 ff.

In the inventive production of branched siloxanes bearing terminal acetoxy functions, at least one reaction partner contains a T and/or Q group (≡Si corresponds to silanic radical and/or any desired silicone radical containing T and/or Q structures).

For the production of siloxanes bearing acetoxy groups, in particular when constructing branched siloxanes bearing acetoxy groups, an input of water is not necessary for obtaining the desired target structures. The abovementioned sub-steps a), b) and c) illustrate this exemplarily.

This inventive finding is in no way foreseeable for the person skilled in the art, because according to practised prior art the input of water, if only in the form of the use of silanes and/or siloxanes containing hydroxy groups, is indispensable for the specific incorporation of T and/or Q units into a siloxane backbone.

Therefore, in a preferred embodiment of the invention, the use of silanes and/or siloxanes containing hydroxy groups is dispensed with, which is particularly attractive from the point of view of avoiding waste as the only by-product formed is an alkyl acetate that can easily be removed from the reaction system, for example by distillation. "Dispense with" in this case means that less than 5 percent by weight of Si-bonded hydroxy groups are present, based on the reactant matrix. In particular, in this preferred embodiment, no proportions of Si-bonded hydroxy groups are present in the reactant matrix at all.

If, in contrast, in a less-preferred embodiment of the invention, silanes and/or siloxanes containing hydroxy groups are used, acetic acid forms as a result as by-product, which can also be seen from the abovementioned exemplary sub-steps d), e), f), g) and h). The acetic acid may for example also be removed from the reaction system by means of distillation.

If, therefore, a reaction system is present which comprises silanes and/or siloxanes bearing alkoxy groups, and/or
silanes/siloxanes bearing acetoxy groups,
and/or silanes and/or siloxanes containing hydroxy groups,
and optionally also simple siloxane cycles and/or DT cycles,
both alkyl acetate and possibly acetic acid are formed in the production of the siloxanes bearing acetoxy functions, and can be separated off as by-products for example by distillation.

Astoundingly, and in a manner unforeseeable for the person skilled in the art, the inventive reaction medium, comprising acetic anhydride, perfluoroalkanesulfonic acid and preferably acetic acid, enables reproducible provision of structurally defined, linear or branched acetoxysiloxanes.

The siloxanes bearing acetoxy groups that result according to the invention are excellent reactants in particular for the production of polyethersiloxanes that are used as interface-active surfactants in demanding technical applications, such as for example for the production of polyurethane foam stabilizers, defoamers, paint and dispersing additives, demulsifiers, among others.

The inventive production process proceeds very rapidly under very moderate reaction conditions, avoids complex reaction sequences, exotic catalysts, by-products that are difficult to separate off, and is preferably conducted without the use of silanes and/or siloxanes bearing hydroxy groups.

The inventive principle will be illustrated below purely by way of example in the case of the production of branched siloxanes bearing acetoxy groups (III) and also branched siloxanes additionally bearing terminal acetoxy groups (VII), where, for the purposes of simplification of the formula representation and also in addition taking into account a preferred embodiment of the inventive process, the use of silanes and/or siloxanes containing hydroxy groups is dispensed with altogether:

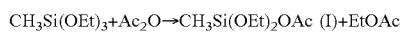     1)

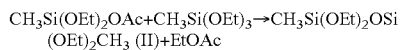     2)

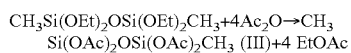     3)

This principle of construction is likewise descriptive when, instead of the methyltriethoxysilane, a pre-equilibrate for example obtained from methyltriethoxysilane with siloxane cycles (e.g. $D_5$) ($=CH_3SiD_aD_bD_c(OEt)_3$) is used, for example:

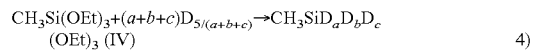     4)

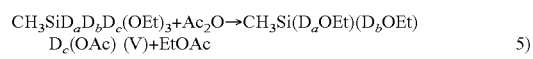     5)

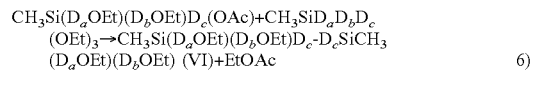     6)

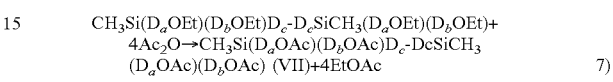     7)

All of the partial reactions presented here by way of example are catalyzed with the aid of strong Brønsted acids, preferably with perfluoroalkylsulfonic acids, particularly preferably with trifluoromethanesulfonic acid.

The exemplary reaction equations 1) to 7) that have just been outlined do not constitute any restriction whatsoever of the claimed subject-matter and are elucidated as follows: Reaction equation 1) shows the reaction of methyltriethoxysilane with one equivalent of acetic anhydride, which affords the acetoxy-functionalized silane $CH_3Si(OEt)_2OAc$ (I) with elimination of ethyl acetate, cf. above.

Consecutive reaction thereof with one equivalent of methyltriethoxysilane results in an SiOSi-bonded, alkoxy-functionalized molecule (II) with release of ethyl acetate (reaction equation 2)).

The reaction of (II) with 4 equivalents of acetic anhydride in turn produces a disiloxane (III) bearing 4 acetoxy groups with release of ethyl acetate (reaction equation 3)).

In a further step, which is not however illustrated in the scheme, disiloxane (III) could then for example be equilibrated with siloxane cycles under acid catalysis to give a branched siloxane bearing terminal acetoxy groups.

Another route of the process claimed according to the invention is shown by reaction equation 4, in which methyltriethoxysilane is initially equilibrated with siloxane cycles to give a singly branched siloxane (IV) $CH_3SiD_aD_bD_c(OEt)_3$ having ethoxy end groups. The indices a, b, c used in the formula for the D units that have been incorporated by equilibration are additionally intended to make it clear that the individual branches of the branched siloxane (IV) may also be different in terms of their length at the equilibrium.

The reaction of (IV) with one equivalent of acetic anhydride affords the singly branched siloxane (V) bearing one acetoxy group and two ethoxy groups with release of ethyl acetate (reaction equation 5)).

By means of stoichiometric reaction of (V) with (IV), condensation takes place to give (VI) with formation of an SiOSi bond and release of ethyl acetate (reaction equation 6).

The doubly branched siloxane (VI) bearing 4 ethoxy end groups is then converted with 4 equivalents of acetic anhydride into the doubly branched siloxane (VII) bearing 4 acetoxy end groups, with 4 equivalents of ethyl acetate being released (reaction equation 7)).

This route for producing branched siloxanes bearing terminal acetoxy groups, which has been illustrated by way of example in reaction equations 4) to 7), is shown in inventive Example 1, with a structural degree of branching of 3 (≠2 in reaction equations 4) to 7)) being sought there.

Beyond the partial reactions shown in great detail in reaction equations 4) to 7) (but also in 1) to 3)), inventive Example 1 makes it clear that a demanding molecular target structure is achieved in a very simple manner by way of the stoichiometric use of the reactants and in addition by way of suitable selection of the reaction conditions.

At the same time, inventive Example 1 also illustrates that the reaction of silanes bearing alkoxy groups and/or (as shown there) siloxanes bearing alkoxy groups with acetic anhydride analogously to reaction equations 5) to 7) is an overall reaction featuring exothermicity (rise in temperature of 40° C.).

Within the context of a sequenced procedure, Example 1 firstly provides for the trifluoromethanesulfonic acid-acidified equilibration of a branched siloxane bearing terminal ethoxy groups (=pre-equilibrate), which is then converted into the sought, branched siloxane bearing terminal acetoxy groups by addition of acetic anhydride and acetic acid. Since the pre-equilibrate still contains trifluoromethanesulfonic acid, in the second step the addition of acetic anhydride and acetic acid leads to the reaction medium claimed according to the invention.

The time of addition of the silane and/or siloxane bearing acetoxy groups and used in the reaction medium is less critical and can be varied over a wide range. Thus, according to the invention, it is also possible to produce the silane and/or siloxane bearing acetoxy groups in situ from precursors not bearing acetoxy groups, such as possibly simple siloxane cycles, DT cycles and/or silanes and/or siloxanes containing hydroxy groups, in the reaction medium comprising acetic anhydride, perfluoroalkanesulfonic acid and preferably acetic acid.

In one embodiment according to the invention, for example, siloxanes containing hydroxy groups can be converted directly into a siloxane bearing terminal acetoxy groups in the reaction medium comprising acetic anhydride, perfluoroalkanesulfonic acid and preferably acetic acid. A reaction system also including siloxane cycles is illustrated in reaction equation 6).

By way of example, the inventive use of commercially available PDM siloxanes (especially α,ω-polydimethylsiloxanediols) as siloxanes bearing hydroxy groups therefore directly opens up access to α,ω-diacetoxypolydimethylsiloxanes.

The inventors have found that the composition of the reaction system defined according to the invention can be freely chosen, so long as it is reacted in the inventive reaction medium comprising acetic anhydride, perfluoroalkanesulfonic acid and preferably acetic acid. It has surprisingly been found that the inventive reaction medium, comprising acetic anhydride, perfluoroalkanesulfonic acid and preferably acetic acid, enables a specific provision of linear or branched siloxanes bearing terminal acetoxy functions in reaction systems of any desired composition, comprising silanes and/or siloxanes bearing alkoxy groups
and/or
silanes and/or siloxanes bearing acetoxy groups,
and/or
silanes and/or siloxanes containing hydroxy groups
optionally simple siloxane cycles
optionally DT cycles.

Inventive Example 1 thus illustrates the case where a branched silicone equilibrate bearing terminal alkoxy groups, as sole reactant, is converted in a controlled manner into a branched siloxane bearing terminal acetoxy groups using the reaction medium, consisting in said example of acetic anhydride, trifluoromethanesulfonic acid and acetic acid.

In a deviation from the route taken in Example 1, it is likewise possible according to the invention for all reactants to be initially charged directly with the reaction medium from the start, while thoroughly mixing well, and then to be reacted after heating and removal of volatile by-products (inventive Example 2). This corresponds to a preferred embodiment.

Depending on the sought structure of the siloxane bearing terminal acetoxy groups, within the context of this invention a sequenced procedure (analogously to Example 1) or else a concerted procedure (analogously to Example 2) may be advantageous, both corresponding in each case to preferred embodiments of the invention.

It is thus preferred, when constructing branched siloxanes bearing terminal acetoxy groups and for example containing a plurality of T units in the central siloxane backbone, to firstly produce a pre-equilibrate in the central molecular structure of which the T units have already been surrounded by branches formed by D units (cf. in relation to this formula (IV) $CH_3SiD_aD_bD_c(OEt)_3$ in reaction equations 4) and 5)). This corresponds to a preferred embodiment.

This preferred procedure is apparent to the person skilled in the art since accumulations of T units that are directly bonded to one another are to be avoided, as these T units that are directly bonded to one another via siloxanyl bridges can be separated only with great difficulty in the later course of the reaction. As can be inferred from the literature, the breaking up of homologous siloxane chains consisting of T units under acid catalysis in particular is difficult.

With regard to the reactivity characteristics of M, D and T units, reference is made to M. A.

Brook, "Silicon in Organic, Organometallic and Polymer Chemistry", John Wiley & Sons, Inc., New York (2000), p. 264 ff.

In the case of linear α,ω-diacetoxypolydimethylsiloxanes, this task does not arise, and so all reactants can be initially charged together with the inventive reaction medium (that is to say in a concerted manner) and reacted. This corresponds to a preferred embodiment.

The inventive reaction systems of any desired composition comprise, for example, the reactants that are presented by way of example in a simplified manner below:

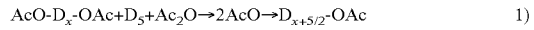

$$AcO\text{-}D_x\text{-}OAc+D_5+Ac_2O \rightarrow 2AcO\text{-}D_{x+5/2}\text{-}OAc \qquad 1)$$

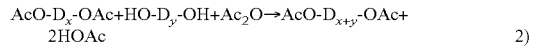

$$AcO\text{-}D_x\text{-}OAc+HO\text{-}D_y\text{-}OH+Ac_2O \rightarrow AcO\text{-}D_{x+y}\text{-}OAc+ 2HOAc \qquad 2)$$

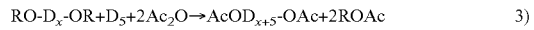

$$RO\text{-}D_x\text{-}OR+D_5+2Ac_2O \rightarrow AcOD_{x+5}\text{-}OAc+2ROAc \qquad 3)$$

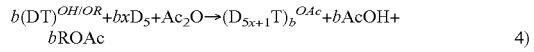

$$b(DT)^{OH/OR}+bxD_5+Ac_2O \rightarrow (D_{5x+1}T)_b^{OAc}+bAcOH+ bROAc \qquad 4)$$

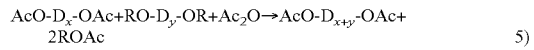

$$AcO\text{-}D_x\text{-}OAc+RO\text{-}D_y\text{-}OR+Ac_2O \rightarrow AcO\text{-}D_{x+y}\text{-}OAc+ 2ROAc \qquad 5)$$

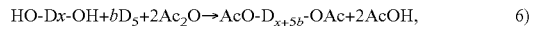

$$HO\text{-}Dx\text{-}OH+bD_5+2Ac_2O \rightarrow AcO\text{-}D_{x+5b}\text{-}OAc+2AcOH, \qquad 6)$$

wherein in these:
1) depicts an acetoxysilane (X=1) and/or linear acetoxysiloxane (X>1) with siloxane cycles,
2) depicts an acetoxysilane (X=1) and/or linear acetoxysiloxane (X>1) with a hydroxy-functional silane (y=1) and/or siloxane (y>1),
3) depicts an alkoxysilane (X=1) and/or linear alkoxysiloxane (X>1) with siloxane cycles, 4) depicts hydroxy-/alkoxy-functional DT cycles, having the same molar proportions of OH/OR groups, with siloxane cycles and
5) depicts an acetoxysilane (X=1) and/or linear acetoxysiloxane (X>1) with an alkoxysilane (X=1) and/or linear alkoxysiloxane (X>1) and
6) depicts a hydroxy-functional linear siloxane with siloxane cycles. In all reactions, the reaction medium comprises acetic anhydride, perfluoroalkanesulfonic acid and preferably acetic acid.

The structure $(D_{5x+1}T)_b^{OAc}$ from reaction row 4) is intended herein to be representative of a branched acetoxysiloxane containing T structures and having terminal acetoxy groups, wherein b(5x+1) represents the total D units (=b(a+1)+2a+2) in formula 1 and $R^1$ is the methyl radical:

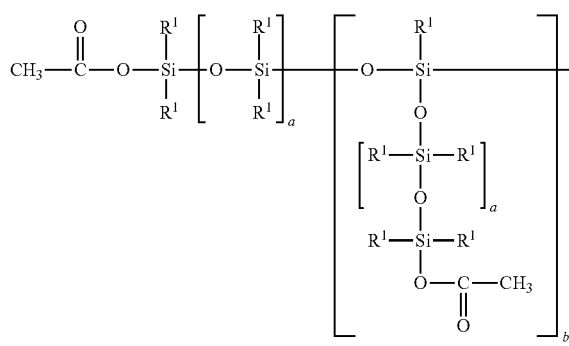

Formula 1

The aforementioned reaction rows 1) to 6) do not represent any restriction whatsoever of the claimed subject-matter. It is apparent to the person skilled in the art from the reactant combinatorics here, reproduced by way of example for the purposes of illustration, that manifold possibilities yet result for combinations that can be used according to the invention by expanding the particular reaction systems by adding further reactants.

Preferred alkoxysilanes used are dimethyldialkoxysilanes, methyltrialkoxysilanes and/or alkyl orthosilicates $Si(OR)_4$. The radical R here means alkyl radical, branched alkyl radical, cycloalkyl radical having 1 to 10 carbon atoms, preferably having 1 to 4, particularly preferably having 2 carbon atoms (=ethyl-).

Preferred alkoxysiloxanes used are linear and/or branched alkoxysiloxanes of the formulae:

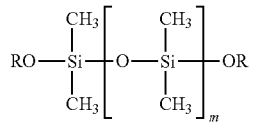

where m=1 to 300, preferably 12 to 150, particularly preferably m=20 to 80, or

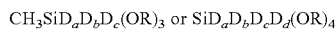

where a, b, c and d are each independently 1 to 100, preferably 2 to 50, particularly preferably 10 to 30 and
R=alkyl radical, branched alkyl radical, cycloalkyl radical having 1 to 10 carbon atoms, preferably having 1 to 4, particularly preferably having 2 carbon atoms (=ethyl-).

Alkoxysiloxanes that are preferably used are available, for example, from acid equilibrations of dimethyldialkoxysilanes or methyltrialkoxysilanes with simple siloxane cycles (for example $D_4/D_5$) or else can be obtained, for example, by the reaction of appropriate acetoxysiloxane precursors with alcohols with elimination of alkyl acetates. Particular preference is given to the use of ethanol.

According to the invention, the amount of acetic anhydride preferably used is dimensioned to the molecular target structure sought, wherein any possible input of silanes and/or siloxanes bearing acetoxy groups but also any possible input effected of hydroxy-functional silanes and/or siloxanes have to be taken into account stoichiometrically. It will be apparent to the person skilled in the art that large excesses of acetic anhydride in the reaction batch are to be avoided, since in the case of excessive use of acetic anhydride the resulting linear or branched siloxanes bearing acetoxy groups tend to be shifted towards lower molar masses, which causes a deviation from the target structure sought.

Likewise, the water content (molecularly bonded and/or else free water) possibly introduced, for example, via hydroxy-functional silanes and/or siloxanes used should also be taken into account stoichiometrically, since each mole of water leads to cleavage of one mole of acetic anhydride or else to a further linking of siloxanes bearing acetoxy groups within the context of the aforementioned reactions g) and h).

In the event of unclear origin of the reactants used and of the possibly associated, uncertain analytical evaluation of the functionality of the acetoxy-/hydroxy-functional silanes and/or siloxanes present therein (including the free water possibly present therein), it is advisable to carry out a few exploratory preliminary experiments for producing the target structure sought in order to define the respective formulation with appropriate certainty.

This preferred procedure can likewise serve to eliminate possible uncertainties with the use of silanes and/or siloxanes bearing alkoxy groups.

Acetoxysilanes used are preferably diacetoxydimethylsilane and triacetoxymethylsilane. In the event of use of acetoxysiloxanes, preference is given to using those that have been described in the as-yet unpublished European patent application EP18189073.2.

Simple siloxane cycles used are preferably $D_3$ (hexamethylcyclotrisiloxane), $D_4$ (octamethylcyclotetrasiloxane), $D_5$ (decamethylcyclopentasiloxane), $D_6$ (dodecamethylcyclohexasiloxane). Preference is given to using $D_4$ and/or $D_5$, particularly preferably $D_5$.

Hydroxy-functional silanes used are preferably dimethylsilanol $(CH_3)Si(OH)_2$, methylsilanol $(CH_3Si(OH)_3)$ and orthosilicic acid $Si(OH)_4$.

Hydroxy-functional siloxanes used are preferably α,ω-polydimethylsiloxanediols (PDM siloxanes) of the formula:

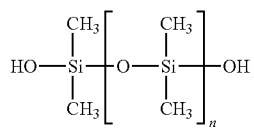

where n=1 to 300, preferably n=12 to 150, particularly preferably n=20 to 80.

Cyclic branched siloxanes of the DT type (DT cycles) used are preferably
a) mixtures of cyclic branched siloxanes of the D/T type which consist exclusively of siloxanes having D and T units and whose cumulative proportion of D and T units present in the siloxane matrix and having Si-alkoxy and/or SiOH groups, determinable by $^{29}$Si NMR spectroscopy, is ≤2 mole percent, preferably less than 1 mole percent, and which preferably contain at least 5 percent by weight of siloxane cycles, such as preferably octamethylcyclotetrasiloxane ($D_4$), decamethylcyclopentasiloxane ($D_5$) and/or mixtures of these or else
b) also mixtures of cyclic branched siloxanes having exclusively D and T units whose cumulative proportion of D and T units present in the siloxane matrix and having Si-alkoxy and/or SiOH groups, determinable by $^{29}$Si NMR spectroscopy, is greater than 2 and less than 10 mole percent.

According to a preferred embodiment of the invention, acetic acid is added in amounts of 0.4 to 3.5 percent by weight, with preference 0.5 to 3 percent by weight, preferably 0.8 to 1.8 percent by weight, particularly preferably in amounts of 1.0 to 1.5 percent by weight, based on the reaction system.

The perfluoroalkanesulfonic acid used is preferably perfluorobutanesulfonic acid or trifluoromethanesulfonic acid, but especially trifluoromethanesulfonic acid.

The catalyst perfluoroalkanesulfonic acid, in particular specifically trifluoromethanesulfonic acid, is used according to a preferred embodiment of the invention in amounts of 0.1 to 1.0 percent by mass, preferably 0.1 to 0.3 percent by mass, based on the reaction system.

In order to assure the equilibration quality aimed for in the siloxanes bearing acetoxy groups, the procedure according to the invention is preferably as follows.

The indicator of attaining the equilibrium employed is the total cycles content determined by gas chromatography and defined as the sum total of the $D_4$, $D_5$, and $D_6$ contents, based on the siloxane matrix and ascertained after derivatization of the α,ω-diacetoxypolydimethylsiloxanes or of the branched siloxanes bearing acetoxy groups to give the corresponding α,ω-diisopropoxypolydimethylsiloxanes or the branched siloxanes bearing isopropoxy groups. The derivatization to give the α,ω-diisopropoxypolydimethylsiloxanes or the branched siloxanes bearing isopropoxy groups is chosen here deliberately in order to prevent a thermally induced redissociation reaction of the α,ω-diacetoxypolydimethylsiloxanes or of the branched siloxanes bearing acetoxy groups which may take place under the conditions of analysis by gas chromatography (regarding the redissociation reaction, see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, 0-Metal Derivates of Organic Hydroxy Compounds p. 162 ff)).

The term "end-equilibrated" is to be understood within the context of the invention to mean that the equilibrium established at a temperature of 23° C. and a pressure of 1013.25 hPa has been reached. The indicator of attaining the equilibrium employed may be the total cycles content determined by gas chromatography and defined as the sum total of the $D_4$, $D_5$, and $D_6$ contents, based on the siloxane matrix and ascertained after derivatization of the α,ω-diacetoxypolydimethylsiloxanes to give the corresponding α,ω-diisopropoxypolydimethylsiloxanes or after the derivatization of the branched acetoxysiloxanes to give the corresponding branched isopropoxysiloxanes.

The inventive use of acetic acid makes it possible here without difficulty to undershoot otherwise customary equilibrium proportions of about 13 percent by weight of total cycles content for the linear α,ω-diacetoxypolydimethylsiloxanes and of about 8 percent by weight of total cycles content for the branched acetoxysiloxanes.

Accordingly, it corresponds to a preferred embodiment when equilibrium proportions of the total cycles content of less than 13, preferably less than 12 percent by weight for the linear α,ω-diacetoxypolydimethylsiloxanes and equilibrium proportions of the total cycles content of less than 8, preferably less than 7 percent by weight for the branched acetoxysiloxanes are undershot.

According to a preferred embodiment, the reaction is initially conducted in a temperature range from 40 to 120° C. and thereafter, for the purposes of ensuring end equilibration, in the temperature range from 140 to 160° C., this being done over a period of 4 to 10 hours.

It has also been found, according to the invention, that it can be advantageous for the visual appearance of the acetoxysiloxanes obtained if the reaction medium, comprising acetic anhydride, perfluoroalkanesulfonic acid and preferably acetic acid, is divided into portions such that firstly the perfluoroalkanesulfonic acid combined with acetic acid is used and only then is the mixture supplemented by addition of acetic anhydride. This observation is reflected in Examples 1, 2 and 3. This corresponds to a preferred embodiment.

The present invention further relates to trifluoromethanesulfonic acid-acidified, end-equilibrated linear siloxanes bearing α,ω-acetoxy groups and having total cycles contents, defined as the sum total of the content fractions of the cyclic siloxanes comprising $D_4$, $D_5$ and $D_6$, based on the siloxane matrix and determined by gas chromatography after their derivatization to give the corresponding linear α,ω-isopropoxysiloxanes, of less than 13, preferably less than 12 percent by weight, preferably produced by a process according to the invention as described above.

The present invention further relates to trifluoromethanesulfonic acid-acidified, end-equilibrated branched siloxanes bearing acetoxy groups and preferably produced as described herein, wherein they have total cycles contents, defined as the sum total of the content fractions of the cyclic siloxanes comprising $D_4$, $D_5$ and $D_6$, based on the siloxane matrix and determined by gas chromatography after their derivatization to give the corresponding branched isopropoxysiloxanes, of less than 8, preferably less than 7 percent by weight.

EXAMPLES

The examples which follow are provided merely to elucidate this invention to those skilled in the art and do not constitute any limitation of the claimed subject matter whatsoever. The determination of water contents is in principle performed by the Karl Fischer method based on DIN 51777, DGF E-III 10 and DGF C-III 13a. $^{29}$Si NMR spectroscopy was used for reaction monitoring in all examples.

In the context of the present invention, the $^{29}$Si NMR samples are analyzed at a measurement frequency of 79.49 MHz in a Bruker Avance III spectrometer equipped with a 287430 sample head with gap width of 10 mm, dissolved at 22° C. in CDCl$_3$ and against a tetramethylsilane (TMS) external standard [d($^{29}$Si)=0.0 ppm].

GPCs (gel permeation chromatography) are recorded using THE as the mobile phase on an SDV 1000/10000A column combination having a length of 65 cm, ID 0.80, at a temperature of 30° C. using a SECcurity$^2$ GPC System 1260 (PSS Polymer Standards Service GmbH).

The gas chromatograms are recorded on a GC instrument of the GC 7890B type from Agilent Technologies, equipped with a column of the HP-1 type; 30 m×0.32 mm ID×0.25 μm dF (Agilent Technologies no. 19091Z-413E) and hydrogen as carrier gas, with the following parameters:

Detector: FID; 310° C.
Injector: split; 290° C.
Mode: constant flow, 2 ml/min
Temperature programme: 60° C. at 8° C./min-150° C. at 40° C./min-300° C. 10 min.

The indicator of attaining the equilibrium employed is the total cycles content determined by gas chromatography and defined as the sum total of the D$_4$, D$_5$, and D$_6$ contents, based on the siloxane matrix and ascertained after derivatization of the α,ω-diacetoxypolydimethylsiloxanes or of the branched siloxanes bearing acetoxy groups to give the corresponding α,ω-diisopropoxypolydimethylsiloxanes or the branched siloxanes bearing isopropoxy groups. The derivatization to give the α,ω-diisopropoxypolydimethylsiloxanes or the branched siloxanes bearing isopropoxy groups is chosen here deliberately in order to prevent a thermally induced redissociation reaction of the α,ω-diacetoxypolydimethylsiloxanes or of the branched siloxanes bearing acetoxy groups which may take place under the conditions of analysis by gas chromatography (regarding the redissociation reaction, see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, 0-Metal Derivates of Organic Hydroxy Compounds p. 162 ff)).

Example 1 (Inventive)

In a 500 ml four-neck round-bottom flask with a precision glass stirrer, an internal thermometer, and a reflux condenser on top, 35.8 g of methyltriethoxysilane (0.263 mol) together with 166.3 g of decamethylcyclopentasiloxane (D$_5$) (0.448 mol) are initially charged at 23° C. with stirring and admixed with 0.51 g of trifluoromethanesulfonic acid (0.25 mass % based on the batch), and equilibrated at 60° C. for 4 hours.

55.0 g of acetic anhydride and 3.9 g of acetic acid are then added within 5 minutes, with the reaction batch taking on a brownish coloration. A temperature rise of the reaction mixture to 100° C. can be observed during the addition.

The reflux condenser is then exchanged for a distillation bridge.

With further heating to 150° C., in the temperature range between 105° C. to 120° C., a distillate passes over, of which an amount of 45.3 g (41.3 g theoretical amount) was determined. Analysis of the distillate ($^1$H NMR and pH measurement using universal indicator paper) shows that it consists of ethyl acetate and some entrained acetic acid.

Thereafter, the reaction batch is left to react further for 6 hours at 150° C., and the reaction batch is allowed to cool to 23° C.

This affords a brownish, clear, trifluoromethanesulfonic acid-acidified, branched siloxane bearing terminal acetoxy functions, whose target structure is substantiated by the accompanying $^{29}$Si NMR spectroscopy. The $^{29}$Si NMR spectroscopy likewise assures that no contents whatsoever of SiOH/SiOR groups are present, within the scope of measurement accuracy.

Conversion of the Branched Acetoxysiloxane into the Corresponding Branched Isopropoxysiloxane for Analytical Characterization Immediately after the synthesis, in a 250 ml four-neck round-bottom flask equipped with a precision glass stirrer, an internal thermometer, and a reflux condenser on top, 100.0 g of this trifluoromethanesulfonic acid-acidified, equilibrated branched acetoxysiloxane are mixed together with 23.2 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are separated off using a fluted filter.

A colorless, clear liquid is isolated, whose accompanying $^{29}$Si NMR spectrum substantiates the quantitative conversion of the branched acetoxysiloxane into a branched isopropoxysiloxane.

An aliquot of this branched isopropoxysiloxane is withdrawn and analyzed by gas chromatography. The gas chromatogram shows the following contents (data in percent by mass):

| D$_4$ | D$_5$ | D$_6$ | Sum total (D$_4$-D$_6$) | Isopropanol content | Ethyl acetate content |
|---|---|---|---|---|---|
| 1.94% | 1.09% | 0.32% | 3.35% | 12.50% | 2.51% |

Taking the isopropanol excess and the ethyl acetate content into account, the contents of siloxane cycles (D$_4$, D$_5$ and D$_6$) are calculated here solely based on the siloxane proportion.

Example 2 (Inventive)

In a 500 ml four-neck round-bottom flask with a precision glass stirrer, an internal thermometer, and a distillation bridge on top with distillate receiver, 35.8 g of methyltriethoxysilane (0.263 mol) together with 166.3 g of decamethylcyclopentasiloxane (D$_5$) (0.448 mol) are initially charged together with 55.0 g of acetic anhydride and 3.9 g of acetic acid at 23° C. with stirring, and admixed with 0.51 g of trifluoromethanesulfonic acid (0.25 mass % based on the batch). The temperature of the reaction mixture rises to 50° C.

The reaction mixture is heated to 150° C. within 30 minutes. 49.8 g of distillate are removed (41.3 g theoretical amount) in the temperature range between 105° C. and 120° C. Analysis of the distillate (H NMR and pH measurement using universal indicator paper) shows that it consists of ethyl acetate and some entrained acetic acid.

Thereafter, the reaction batch is left to react further for 6 hours at 150° C., and the reaction batch is allowed to cool to 23° C.

This affords a brown, clear, trifluoromethanesulfonic acid-acidified, branched siloxane bearing terminal acetoxy functions, whose target structure is substantiated by the accompanying $^{29}$Si NMR spectroscopy. The $^{29}$Si NMR spectroscopy likewise assures that no contents whatsoever of SiOH/SiOR groups are present, within the scope of measurement accuracy.

Conversion of the Branched Acetoxysiloxane into the Corresponding Branched Isopropoxysiloxane for Analytical Characterization Immediately after the synthesis, in a 250 ml four-neck round-bottom flask equipped with a precision glass stirrer, an internal thermometer, and a reflux condenser on top, 100.0 g of this trifluoromethanesulfonic acid-acidified, equilibrated branched acetoxysiloxane are mixed together with 23.2 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are separated off using a fluted filter.

A colorless, clear liquid is isolated, whose accompanying $^{29}$Si NMR spectrum substantiates the quantitative conversion of the branched acetoxysiloxane into a branched isopropoxysiloxane.

An aliquot of this branched isopropoxysiloxane is withdrawn and analyzed by gas chromatography. The gas chromatogram shows the following contents (data in percent by mass):

| $D_4$ | $D_5$ | $D_6$ | Sum total ($D_4$-$D_6$) | Isopropanol content | Ethyl acetate content |
|---|---|---|---|---|---|
| 1.84% | 1.02% | 0.28% | 3.14% | 10.11% | 2.10% |

Taking the isopropanol excess and the ethyl acetate content into account, the contents of siloxane cycles ($D_4$, $D_5$ and $D_6$) are calculated here solely based on the siloxane proportion.

Example 3 (Inventive)

In a 500 ml four-neck round-bottom flask with a precision glass stirrer, an internal thermometer, and a reflux condenser on top, 35.8 g of methyltriethoxysilane (0.263 mol) together with 166.3 g of decamethylcyclopentasiloxane ($D_5$) (0.448 mol) are initially charged at 23° C. with stirring and admixed with 0.51 g of trifluoromethanesulfonic acid (0.25 mass % based on the batch), and equilibrated at 60° C. for 4 hours.

6.8 g of acetic acid are then added and the mixture is stirred for a further 30 minutes at 60° C. 55.0 g of acetic anhydride are added within 5 minutes. A temperature rise to 100° C. can be observed during the addition and the reaction mixture remains virtually colorless.

The reflux condenser is then exchanged for a distillation bridge.

With further heating to 150° C., in the temperature range between 105° C. to 120° C., a distillate passes over, of which an amount of 50.1 g (41.3 g theoretical amount) was determined. Analysis of the distillate ($^1$H NMR and pH measurement using universal indicator paper) shows that it consists of ethyl acetate and entrained acetic acid.

Thereafter, the reaction batch is left to react further for 6 hours at 150° C., and the reaction batch is allowed to cool to 23° C.

This affords a virtually colorless, clear, trifluoromethanesulfonic acid-acidified, branched siloxane bearing terminal acetoxy functions, whose target structure is substantiated by the accompanying $^{29}$Si NMR spectroscopy. The $^{29}$Si NMR spectroscopy likewise assures that no contents whatsoever of SiOH/SiOR groups are present, within the scope of measurement accuracy.

Conversion of the Branched Acetoxysiloxane into the Corresponding Branched Isopropoxysiloxane for Analytical Characterization Immediately after the synthesis, in a 250 ml four-neck round-bottom flask equipped with a precision glass stirrer, an internal thermometer, and a reflux condenser on top, 100.0 g of this trifluoromethanesulfonic acid-acidified, equilibrated branched acetoxysiloxane are mixed together with 23.2 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are separated off using a fluted filter.

A colorless, clear liquid is isolated, whose accompanying $^{29}$Si NMR spectrum substantiates the quantitative conversion of the branched acetoxysiloxane into a branched isopropoxysiloxane.

An aliquot of this branched isopropoxysiloxane is withdrawn and analyzed by gas chromatography. The gas chromatogram shows the following contents (data in percent by mass):

| $D_4$ | $D_5$ | $D_6$ | Sum total ($D_4$-$D_6$) | Isopropanol content | Ethyl acetate content |
|---|---|---|---|---|---|
| 1.88% | 1.04% | 0.30% | 3.22% | 11.50% | 2.30% |

Taking the isopropanol excess and the ethyl acetate content into account, the contents of siloxane cycles ($D_4$, $D_5$ and $D_6$) are calculated here solely based on the siloxane proportion.

The invention claimed is:

1. A reaction system for the production of siloxanes bearing acetoxy functions, comprising
    a) silanes and/or siloxanes bearing alkoxy groups and/or
    b) silanes and/or siloxanes bearing acetoxy groups, and/or
    c) silanes and/or siloxanes bearing hydroxy groups,
    d) optionally simple siloxane cycles comprising $D_3$ (hexamethyl cyclotrisiloxane), $D_4$ (octamethylcyclotetrasiloxane), $D_5$ (decamethylcyclopentasiloxane) and/or $D_6$ (dodecamethylcyclohexasiloxane), and/or DT cycles,
    e) a reaction medium, comprising acetic anhydride and perfluoroalkanesulfonic acid.

2. The reaction system according to claim 1 for the production of branched siloxanes bearing terminal acetoxy functions, wherein a silane and/or siloxane bearing alkoxy groups and containing at least one T and/or Q group, and/or a silane/siloxane bearing acetoxy groups and containing at least one T and/or Q group, and/or DT cycles are reacted.

3. The reaction system according to claim 1, wherein no silanes and/or siloxanes bearing hydroxy groups are used.

4. The reaction system according to claim 1, wherein alkoxysilanes are used.

5. The reaction system according to claim 1, wherein linear and/or branched alkoxysiloxanes are used

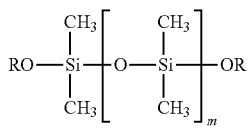

where m=1 to 300.

6. The reaction system according to claim 5, wherein the alkoxysiloxanes used result from acidic equilibration of dimethyldialkoxysilanes or methyltrialkoxysilanes with simple siloxane cycles.

7. The reaction system according to claim 1, wherein hydroxy-functional silanes and/or hydroxy-functional siloxanes are used

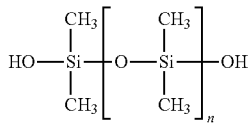

wherein n=1 to 300.

8. The reaction system according to a claim 1, wherein cyclic branched siloxanes of the DT type (DT cycles) are selected from the group consisting of
   i) mixtures of cyclic branched siloxanes of the D/T type which consist exclusively of siloxanes having D and T units and whose cumulative proportion of D and T units present in the siloxane matrix and having Si-alkoxy and/or SiOH groups, determinable by $^{29}$Si NMR spectroscopy, is ≤2 mole percent and which contain at least 5 percent by weight of siloxane cycles, such as octamethylcyclotetrasiloxane ($D_4$), decamethylcyclopentasiloxane ($D_5$) and/or mixtures of these; and
   ii) mixtures of cyclic branched siloxanes having exclusively D and T units whose cumulative proportion of D and T units present in the siloxane matrix and having Si-alkoxy and/or SiOH groups, determinable by $^{29}$Si NMR spectroscopy, is greater than 2 and less than 10 mole percent.

9. A process for producing linear or branched siloxanes bearing acetoxy functions, wherein
   a) silanes and/or siloxanes bearing alkoxy groups, and/or
   b) silanes and/or siloxanes bearing acetoxy groups, and/or
   c) silanes and/or siloxanes bearing hydroxy groups,
   d) optionally simple siloxane cycles comprising $D_3$ (hexamethyl cyclotrisiloxane), $D_4$ (octamethylcyclotetrasiloxane), $D_5$ (decamethylcyclopentasiloxane) and/or $D_6$ (dodecamethylcyclohexasiloxane), and/or DT cycles,
are reacted with acetic anhydride in the presence of a perfluoroalkanesulfonic acid.

10. The process according to claim 9 for producing branched siloxanes bearing terminal acetoxy functions, wherein the component a) used is a branched silicone equilibrate bearing terminal alkoxy groups.

11. The process according to claim 9 for producing branched siloxanes bearing terminal acetoxy functions, wherein all components a) and/or b) and also optionally c) and possibly d) are initially charged and reacted together with acetic anhydride in the presence of a perfluoroalkanesulfonic acid.

12. The process according to claim 9 for producing α,ω-diacetoxypolydimethylsiloxanes, wherein component c) is reacted, alone and/or optionally together with simple siloxane cycles, with acetic anhydride in the presence of a perfluoroalkanesulfonic acid.

13. The process according to claim 9, wherein
   a) silanes and/or siloxanes bearing alkoxy groups and/or
   b) silanes and/or siloxanes bearing acetoxy groups, and/or
   c) silanes and/or siloxanes bearing hydroxy groups,
   d) optionally simple siloxane cycles and/or DT cycles,
   are reacted in a reaction medium further comprising acetic acid.

14. The trifluoromethanesulfonic acid-acidified, end-equilibrated linear siloxanes bearing α,ω-acetoxy groups and having total cycles content, as determined by gas chromatography of less than 13 percent by weight produced by a process according to claim 9.

15. The trifluoromethanesulfonic acid-acidified, end-equilibrated branched siloxanes bearing acetoxy groups, produced by a process according to claim 9, wherein they have total cycles content, as determined by gas chromatography of less than 8 percent by weight.

16. A product comprising the siloxanes bearing acetoxy groups, produced using a reaction system as defined in claim 1 wherein the product comprises polyurethane foam stabilizers, defoamers, paint and dispersing additives and/or demulsifiers.

17. The reaction system according claim 1, wherein alkoxysilanes are selected from dimethyldialkoxysilanes, methyltrialkoxysilanes and/or alkyl orthosilicates Si(OR)$_4$, where R=alkyl radical, branched alkyl radical or cycloalkyl radical, having 1 to 10.

18. The reaction system according claim 1, wherein alkoxysilanes are selected from dimethyldialkoxysilanes, methyltrialkoxysilanes and/or alkyl orthosilicates Si(OR)$_4$, where R=ethyl-.

19. The reaction system according to claim 1, wherein the reaction system comprises linear and/or branched alkoxysiloxanes having the formula:

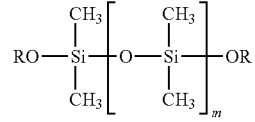

where m=1 to 300, or

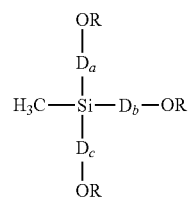

or

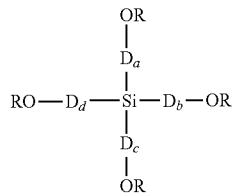

where a, b, c and d are each independently 1 to 100 and R=alkyl radical, branched alkyl radical, cycloalkyl radical having 1 to 10.

20. The process according to claim 11, wherein said perfluoroalkanesulfonic acid is trifluoromethanesulfonic acid.

21. The process according to claim 12, wherein said perfluoroalkanesulfonic acid is trifluoromethanesulfonic acid.

22. The process according to claim 1, wherein DT cycles are cyclic branched siloxanes of the D/T type which consist exclusively of siloxanes having D and T units.

\* \* \* \* \*